United States Patent
Hardå et al.

(10) Patent No.: US 11,814,040 B2
(45) Date of Patent: Nov. 14, 2023

(54) SYSTEM AND METHOD FOR AVOIDING A COLLISION COURSE

(71) Applicants: Volvo Car Corporation, Gothenburg (SE); Zenuity AB, Gothenburg (SE)

(72) Inventors: Peter Hardå, Torslanda (SE); Anders Ödblom, Bohus-Björkö (SE); Nasser Mohammadiha, Gothenburg (SE); Andrew Backhouse, Gothenburg (SE); Anders Movert, Gothenburg (SE)

(73) Assignees: Volvo Car Corporation, Gothenburg (SE); Zenuity AB, Gothenburg (SE)

(*) Notice: Subject to any disclaimer, the term of this patent is extended or adjusted under 35 U.S.C. 154(b) by 204 days.

(21) Appl. No.: 16/505,789

(22) Filed: Jul. 9, 2019

(65) Prior Publication Data
US 2020/0023835 A1 Jan. 23, 2020

(30) Foreign Application Priority Data
Jul. 20, 2018 (EP) .................................. 18184743

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *B60W 30/0956* (2013.01);
(Continued)

(58) Field of Classification Search
CPC ............. B60W 30/09; B60W 30/0956; B60W 50/0097; B60W 50/14; B60W 2555/20;
(Continued)

(56) References Cited

U.S. PATENT DOCUMENTS 9,248,834 B1 * 2/2016 Ferguson .......... B60W 60/0027
2007/0282530 A1 12/2007 Meister et al.
(Continued)

FOREIGN PATENT DOCUMENTS

| CN | 101350134 A | 1/2009 |
| CN | 101407199 A | 4/2009 |

(Continued)

OTHER PUBLICATIONS

Mar. 28, 2019 European Search Report issue on International Application No. EP18184743.
(Continued)

*Primary Examiner* — Dale W Hilgendorf
*Assistant Examiner* — Hana Lee
(74) *Attorney, Agent, or Firm* — Clements Bernard Walker; Christopher L. Bernard

(57) ABSTRACT

A method for predicting a trajectory of at least one secondary road user for avoiding a collision course with the secondary road user for a host vehicle. The method includes determining the present location for the host vehicle, retrieving a plurality of modelled clusters of trajectories for a present traffic situation, and detecting the position and speed of the at least one secondary road user. The method also includes predicting at least one feasible trajectory for the at least one secondary road user based on the position and the speed of the at least one secondary road user to the plurality of modelled clusters of trajectories and selecting at least one feasible trajectory of the feasible trajectories for each secondary road user based on a selection criterion. At least one action is performed based on the selected at least one feasible trajectory.

15 Claims, 8 Drawing Sheets

(51) Int. Cl.
- *B60W 30/095* (2012.01)
- *B60W 50/00* (2006.01)
- *B60W 50/14* (2020.01)
- *G06N 3/08* (2023.01)

(52) U.S. Cl.
CPC ........ *B60W 50/0097* (2013.01); *B60W 50/14* (2013.01); *G06N 3/08* (2013.01); *B60W 2050/0031* (2013.01); *B60W 2420/42* (2013.01); *B60W 2554/80* (2020.02); *B60W 2555/20* (2020.02); *B60W 2555/60* (2020.02)

(58) Field of Classification Search
CPC ......... B60W 2555/60; B60W 2554/80; B60W 2050/0031; B60W 2420/42; B60Q 9/008; G06N 3/08

See application file for complete search history.

(56) References Cited

U.S. PATENT DOCUMENTS

| | | |
|---|---|---|
| 2008/0222294 A1 | 9/2008 | Liang |
| 2008/0303696 A1* | 12/2008 | Aso ................. G08G 1/161 340/935 |
| 2011/0224898 A1* | 9/2011 | Scofield ............ G08G 1/0104 701/532 |
| 2012/0179342 A1* | 7/2012 | Noumura ............ B60W 30/188 701/54 |
| 2012/0218093 A1* | 8/2012 | Yoshizawa ............ G08G 1/163 340/435 |
| 2013/0054132 A1 | 2/2013 | Conner |
| 2015/0063628 A1 | 3/2015 | Bernal et al. |
| 2016/0001775 A1 | 1/2016 | Wilhelm et al. |
| 2016/0325753 A1 | 11/2016 | Stein et al. |
| 2017/0169709 A1* | 6/2017 | Ando ................ G08G 1/161 |
| 2017/0344855 A1* | 11/2017 | Mande .............. G06K 9/00785 |
| 2018/0148036 A1* | 5/2018 | Gaither ........... B60W 30/18027 |
| 2018/0173240 A1 | 6/2018 | Fang et al. |
| 2018/0182245 A1* | 6/2018 | Takabayashi .......... G08G 1/133 |
| 2018/0186370 A1 | 7/2018 | Denson et al. |
| 2018/0374359 A1* | 12/2018 | Li ...................... G06F 18/2185 |
| 2020/0189574 A1* | 6/2020 | Vignard ............ B60W 60/0015 |

FOREIGN PATENT DOCUMENTS

| | | |
|---|---|---|
| CN | 101425228 A | 5/2009 |
| EP | 2562060 A1 | 2/2013 |
| EP | 3053777 A1 | 8/2016 |
| WO | 2018015811 A1 | 1/2018 |

OTHER PUBLICATIONS

Office action and search report issued in the corresponding CN application No. 201910635577.2.

Weiwu, Digital Highway Application Technology Brochure, Apr. 30, 2009, p. 27.

Jianhong et al., Land Rover Structure Principle and Classical Maintenance Examples, Jun. 30, 2016, p. 81.

Jun. 2, 2022, Decision of Rejection issued in the corresponding CN application No. 201910635577.2.

Notification of grant and search report issued in the corresponding CN application No. 201910635577.2.

\* cited by examiner

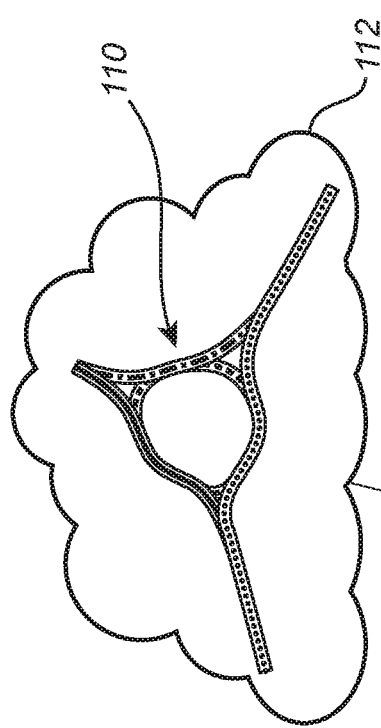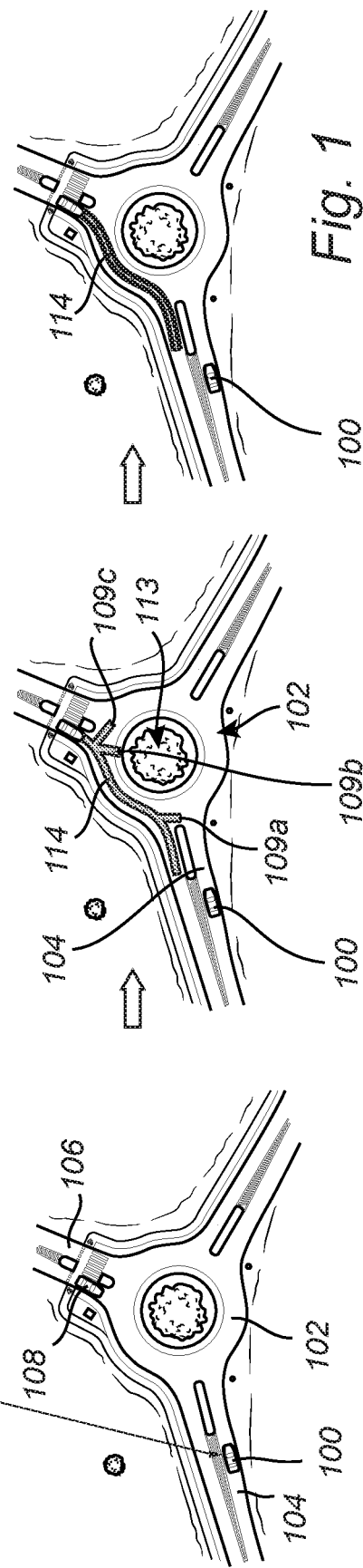

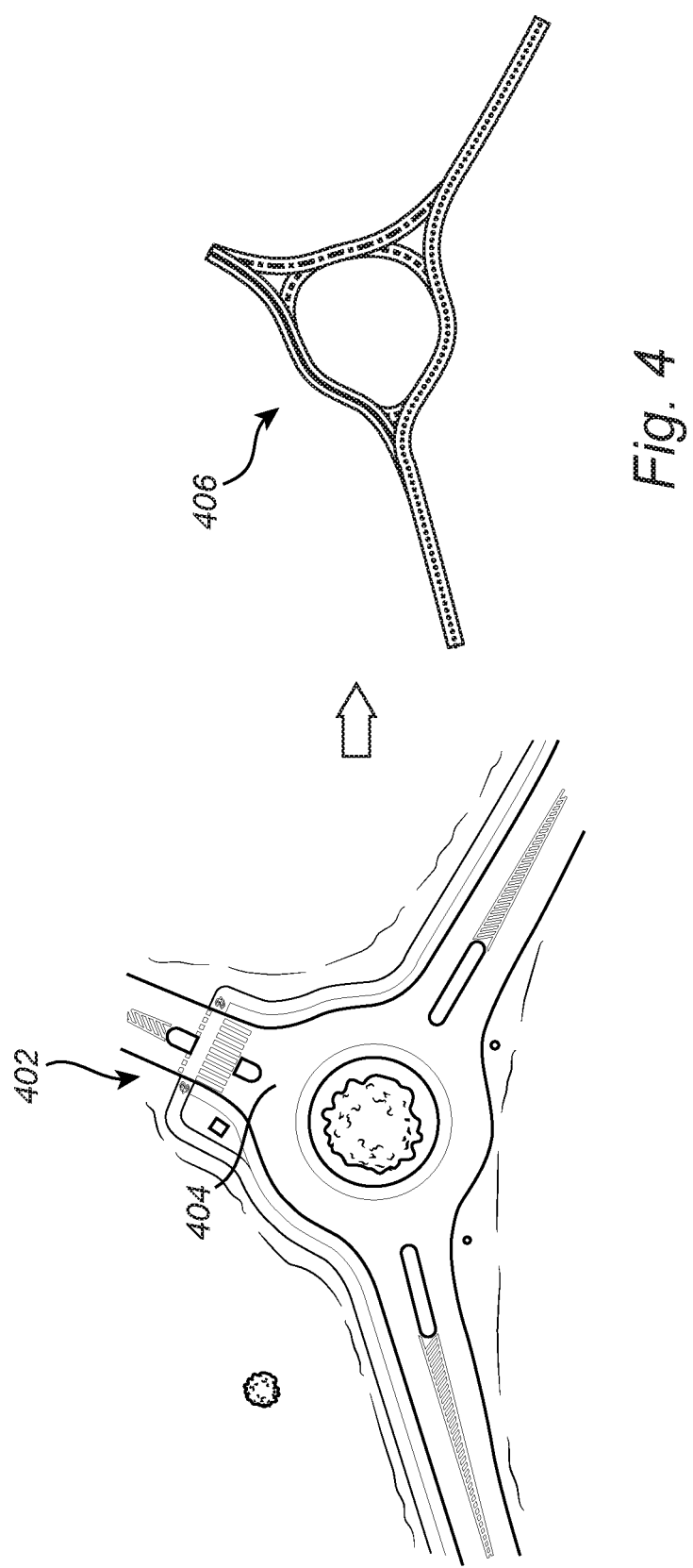

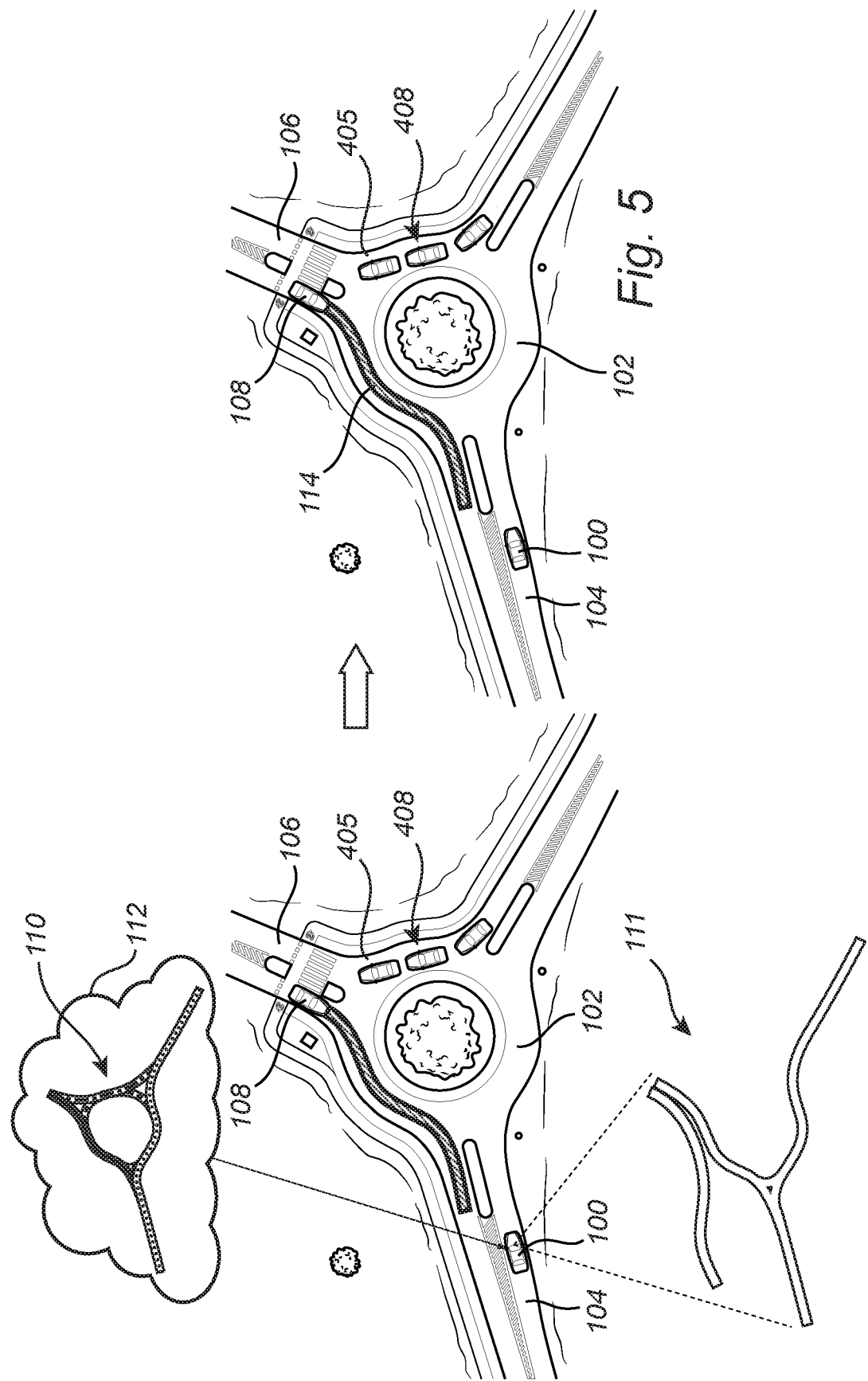

SYSTEM AND METHOD FOR AVOIDING A COLLISION COURSE

CROSS-REFERENCE TO RELATED APPLICATION

The present disclosure claims the benefit of priority of co-pending European Patent Application No. 18184743.5, filed on Jul. 20, 2018, and entitled "SYSTEM AND METHOD FOR AVOIDING A COLLISION COURSE," the contents of which are incorporated in full by reference herein.

TECHNICAL FIELD

The present disclosure relates to a method for predicting a trajectory of at least one secondary road user for avoiding a collision course with the secondary road user for a host vehicle. The disclosure also relates to an active safety system for a vehicle.

BACKGROUND

Advanced driver-assistance systems (ADAS) in vehicles range from cruise control and adaptive lighting to more advanced systems such as automatic emergency braking, automatic emergency steering, lane keeping systems, and warning systems to alert the driver of the presence of other cars, etc. Generally, ADAS retrieve input data from multiple sources such as image processing from cameras, ultra sonic sensors, radar, or LiDAR. More recently, vehicle-to-vehicle connectivity, vehicle-to-infrastructure, and cloud based connectivity are arising as a promising addition to present ADAS.

When more decisions and control are handed over to the vehicle, it becomes capable of driving itself continuously, which is referred to as automated driving (AD). In the following, we include AD and ADAS systems in Active Safety.

Collision avoidance systems use braking or steering, or a combination of both to avoid a collision when the driver of the vehicle fails to observe a critical situation. Collision avoidance system must intervene sufficiently early to avoid the collision.

However, an intervention should not be triggered so early that it interferes with normal driving behavior when the situation would have been resolved naturally without interference. The difficulty of distinguishing between critical and typical situations depends on the scenario and the fidelity of the available sensor information. In low-speed rear-end scenarios it is easier to make this distinction than in intersections with turning oncoming vehicles. The primary reason why it is more difficult to distinguish critical situations from typical situations in certain scenarios is that it in these scenarios it is harder to predict the intentions and likely trajectories of all road users.

For this reason, collision avoidance algorithms will typically evaluate all possible maneuvers which other road users can perform and assume that the safest of these maneuvers is the most likely. This way a collision avoidance system will not cause unnecessary interventions which interfere in non-critical scenarios. However, a collision avoidance system will perform poorly if it limits the possible maneuvers of other road users excessively.

Thus, a problem in constructing a collision avoidance system is therefore to limit the possible maneuvers of other road users to only those maneuvers which can reasonably be expected.

SUMMARY

In view of above, it is an object of the present disclosure to provide an improved method for predicting a trajectory of at least one secondary road user for avoiding a collision course with the secondary road user for a host vehicle.

According to a first aspect of the disclosure, there is provided a method for predicting a trajectory of at least one secondary road user for avoiding a collision course with the secondary road user for a host vehicle, the method including: determining the present location for the host vehicle; retrieving a plurality of modelled clusters of trajectories for a present traffic situation in the vicinity of the present location; detecting the position and speed of the at least one secondary road user in the vicinity of the present traffic situation; predicting at least one feasible trajectory for the at least one secondary road user based on the position and the speed of the at least one secondary road user and the plurality of modelled clusters of trajectories for the present traffic situation; selecting at least one feasible trajectory of the feasible trajectories for each secondary road user based on a selection criterion, and performing at least one action based on the selected at least one feasible trajectory.

The present disclosure is based on the realization that feasible trajectories for a secondary road user in a present traffic situation can be predicted based on previously modelled trajectories for that present traffic situation. The host vehicle may subsequently base its decision making for performing the at least one action on the feasible trajectories of the secondary vehicle and a selection criterion. The selection criterion provides for selecting at least one of the feasible trajectories which the host vehicle bases its decision making on.

Accordingly, modelled clusters of trajectories for traffic situations may be established based on historical trajectories for the traffic situations and used for learning how a vehicle may drive through a traffic situation. Based on a present position of a secondary road user and the modeled trajectories it is possible to determine at least one of the modelled trajectories as a feasible trajectory. The feasible trajectories may for example be those that lie nearby the secondary vehicle's present position. Based on the feasible trajectory (ies) and a selection criterion at least one of the feasible trajectories may be selected as an e.g. most likely or a preferred trajectory for the secondary vehicle, and the appropriate action can be taken by the host vehicle.

Thus, the disclosure provides at least the advantage to be able to determine which maneuver can most reasonably be expected from the secondary road user at the present traffic situation.

The position of a secondary road user may be an absolute position, or it may be a relative position with respect to the host vehicle. The speed of a secondary road user may be an absolute speed or a relative speed with respect to the host vehicle.

The host vehicle may often be referred to as the "ego-vehicle".

A traffic situation may for example be a roundabout, an intersection, a pedestrian crossing, a road section, etc. A traffic situation may also include objects in the vicinity of the round about, an intersection, a pedestrian crossing, a road section, etc. These objects may include other traffic participants such as vehicles, pedestrians etc., but also characteristics of the traffic scene e.g. poles, traffic signs and more.

A secondary road user may for instance be a vehicle such as a car, truck, bus, bicycle, etc., or a pedestrian.

Vehicles applicable for the present inventive concept includes self-driving vehicles, semi-self-driving vehicles, and manually driven vehicles.

A trajectory generally includes a travel path and heading along the path.

A selection criterion may be to select a feasible trajectory that does not cross-over to the same side of the road as the host vehicle, or to select a feasible trajectory that is safe for the secondary road user.

Moreover, a selection criterion may be related to decreasing fuel consumption, provide a comfortable ride, promote careful driving etc., for anyone of the secondary road users or the host vehicle. For example, the host vehicle may drive along a certain trajectory in order to save fuel (or e.g. provide a comfortable ride), and based on the selection criterion to prioritize fuel savings (or e.g. a comfortable ride) for the host vehicle, a feasible trajectory for the secondary vehicle may be selected accordingly. Thus, selection of a feasible trajectory may be affected by selection criterion related to the host vehicle and/or the secondary road user.

More than one feasible trajectory may be selected based on the selection criterion. In case more than one feasible trajectory is selected it is assumed that any of the selected feasible trajectories occur when deciding on performing the at least one action.

In embodiments, the modelled clusters of trajectories may further include a speed profile for each of the trajectories, the method may include: predicting a speed profile for each of the plurality of trajectories for the at least one secondary road user based on comparing the position and the speed of the at least one secondary road user to the modelled clusters of trajectories including modelled speed profiles for the present traffic situation; selecting at least one feasible trajectory of the feasible trajectories including a speed profile for each secondary road user based on the selection criterion, and performing at least one action based on the selected at least one feasible trajectory.

Accordingly, in order to further improve the prediction of the feasible trajectory of the secondary vehicle, the modeled speed profiles for the present traffic situation may be used in the prediction as part of the modelled clusters of trajectories. Moreover, with the inclusion of speed profiles in the trajectories a more accurate selection of the feasible trajectory according to the selection criterion may be made.

Accordingly, the model trajectories and the feasible trajectories may include a speed profile. In some possible implementations the model trajectories and the feasible trajectories may also include an acceleration profile.

According to embodiments, the at least one action may include providing a warning signal indicative of that the host vehicle is on collision course with at least one secondary road user. Thereby the driver of the host vehicle is advantageously notified about the collision course.

In embodiments, it may be included to trigger an intervention action when a warning signal is provided. The intervention action may be to brake or change the present trajectory for the host vehicle.

The at least one action may include selecting a path for the host vehicle to avoid a collision course with the at least one secondary road user.

According to embodiments, generating modelled clusters of trajectories, including the plurality of modelled clusters of trajectories, for a plurality of traffic situations for which scene data is available based on a supervised learning algorithm applied to received trajectory data for a plurality of traffic situations and the geometry of the traffic situations.

Generally, the scene data may be determined from at least one of photos or map data of the traffic situations. The scene data includes the geometry of the traffic situations or any other contextual information available from photos or map data.

Scene data may for example be provided from satellite images of traffic situations. The satellite images provide valuable context information about traffic situations such as roundabouts and intersections. The modelled clusters of trajectories may be generated from satellite images.

Moreover, the scene data may for instance include speed limit data for the traffic situations to further improve the accuracy of the modelled trajectories.

Additionally, the scene data may include indication whether a road is a one-way or two-way road, or the presence of track-bounded traffic such as trains and trams, and any other data that may be found in the photos or map data. The photos may be satellite or other aerial photos and the map data may be high-definition (HD) map data.

In embodiments, the generation of the modelled clusters of trajectories may be performed in a deep neural network.

According to embodiments, there may be included to select the retrieved plurality of modelled clusters of trajectories for the present traffic situation based on a match between the location of the host vehicle and one of the plurality of traffic situations. Accordingly, as the host vehicle is approaching a traffic situation, the location of the host vehicle may be used for selecting the correct plurality of modelled clusters of trajectories relevant for the traffic situation at hand.

The plurality of modelled clusters of trajectories may advantageously depend on time of day, date, or weather, or other measurable environmental conditions. Thus since parameters such as the time of day, the season (date), weather, and other conditions affect the driving style, such parameters may be taken into account in the modelled clusters of trajectories. These parameters may subsequently improve the predicting of at least one feasible trajectory by using the present time of day, date, or weather, or other measurable environmental conditions as input to the prediction step.

In embodiments, the predicting of the at least one feasible trajectory for the at least one secondary road user may be based on the position and the speed of the at least one secondary road user and a sub-class of the plurality of modelled clusters of trajectories for the present traffic situation, the sub-class is determined based on traffic object data indicative of traffic characteristics of the present traffic situation. In this way the prediction of the feasible trajectories may be performed with higher accuracy and less computational power since fewer modelled clusters of trajectories are used as input to the prediction.

Another object of the disclosure is to provide an improved active safety system for avoiding a collision course for a host vehicle with a secondary vehicle.

According to a second aspect of the disclosure, there is provided an active safety system for a host vehicle, including: at least one detection unit for detecting the position and the speed of a secondary road user; a positioning system for determining the present location of the host vehicle, and a vehicle control unit configured to: retrieve a plurality of modelled clusters of trajectories for a present traffic situation, the present traffic situation is based on the present location of the host vehicle; predict at least one feasible trajectory for the at least one secondary road user based on the position and the speed of the at least one secondary road user and the plurality of modelled clusters of trajectories for the present traffic situation; select at least one feasible trajectory of the feasible trajectories for each secondary road user based on a selection criterion, and control the host vehicle to perform at least one action based on the selected at least one feasible trajectory.

The detection unit may include at least one of LIDAR, cameras, ultra sound sensors, radars, etc. capable of detecting nearby objects of the host vehicle.

The at least one action may include to provide a warning signal indicative of that the host vehicle is on collision course with at least one secondary road user.

The control unit may be configured to trigger an intervention action when it is determined that the host vehicle is on collision course with at least one secondary road user.

An intervention action may be either a discrete intervention such as to interfere the driving and for example brake or steer away from a threat that otherwise lead to a collision. Furthermore, an intervention action may be part of a continuous driving adaptation such as for adaptive cruise control or autonomous driving where constant adaptation of driving action is needed.

The at least one action may include to select a path for the host vehicle to avoid a collision course with the at least one secondary road user.

In embodiment, the active safety system may include wireless communication circuitry for receiving the plurality of modelled clusters of trajectories from a server.

Further, in yet another embodiment the detection unit may include a receiver for receiving signals from secondary road user's indicative of their intended driving path and speed, and/or present position. Thereby the prediction of feasible trajectories may be more accurate. The communication between the host vehicle and secondary road user's may be achieved via communication systems selected from any one of V2x ("vehicle-to-everything") communication using wireless communication. V2x includes for instance vehicle-to-vehicle communication, vehicle-to-infrastructure communication, vehicle-to-pedestrian communication, vehicle-to-grid communication, and vehicle-to-device communication.

This second aspect of the disclosure provides similar advantages as discussed above in relation to the previous aspect of the disclosure.

There is further provided a vehicle including an active safety system according to any one of the embodiments of the second aspect.

The vehicle may be an autonomous vehicle.

A server may be configured to receive the present location coordinate of the host vehicle, and to return a model cluster of trajectories to the host vehicle for a traffic situation associated with the traffic situation.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein:

FIG. 1 conceptually illustrates application of embodiments of the disclosure;

FIG. 4 conceptually illustrates generation of model clusters of trajectories from a satellite image;

FIG. 5 conceptually illustrates example embodiments relating to using sub-class of model trajectories for predicting at least one feasible trajectory;

DESCRIPTION OF EMBODIMENTS

Figure 2:
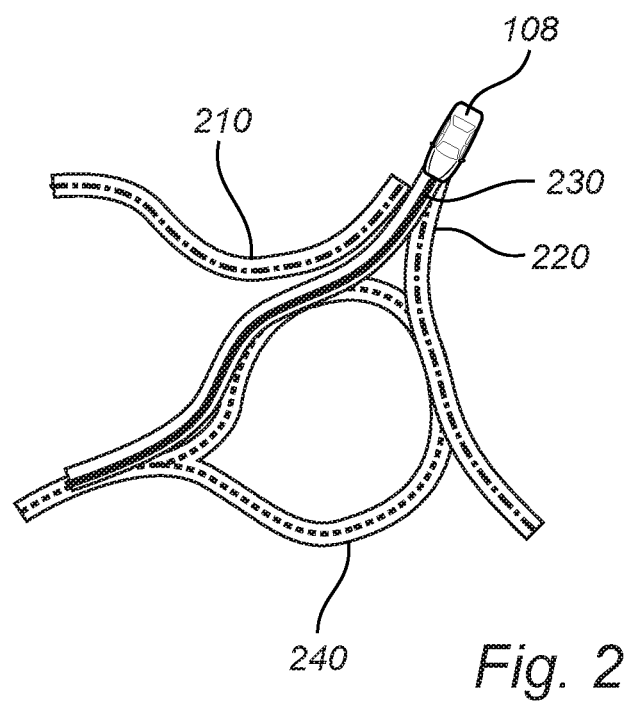
FIG. 2 illustrates an example scenario of predicting at least one feasible trajectory for a secondary road user.

In the present detailed description, various embodiments of the system and method according to the present disclosure are mainly described with reference to secondary road users in the form of cars. However, the present disclosure is equally well applicable to other road users such as trucks, busses, motorbikes, bicycles, pedestrians etc. Furthermore, the present disclosure is applicable to any type of traffic situation and not only to the exemplified traffic situations illustrated herein as roundabouts or intersections. Thus, this disclosure may generally be embodied in many different forms and should not be construed as limited to the embodiments set forth herein; rather, these embodiments are provided for thoroughness and completeness, and to fully convey the scope of the disclosure to the skilled person. Like reference characters refer to like elements throughout.

FIG. 1 conceptually illustrates a host vehicle 100 approaching a traffic situation 102, in this example case the traffic situation is a roundabout 102 including three entries/exits. The host vehicle 100 approaches the roundabout 102 on road 104. On another road 106 leading to the round about 102 a secondary road user in the form of a secondary vehicle 108 approaches the roundabout 102. Based on a present location of the host vehicle 100, determined with e.g. a global positioning system or high definition (HD) maps, a plurality of modelled clusters of trajectories 110 for the roundabout 102 may be retrieved by the host vehicle 100. The modelled clusters of trajectories 110 may be constructed in ways that is described with reference to subsequent drawings. The modelled clusters of trajectories may be retrieved from a server 112, i.e. from the "Cloud".

The host vehicle 100 further includes on-board sensors such as LIDAR, cameras, ultra sound sensors, radars, etc. capable of detecting nearby objects of the host vehicle 100 such as the secondary vehicle 108. The host vehicle 100 may detect the position and speed of the secondary vehicle 108 as the secondary vehicle 108 approaches the round about 102. In addition, the host vehicle 100 may include inertial measurement units including accelerometers, gyroscopes for measuring the yaw rate and the acceleration of the host vehicle 100. Furthermore, the host vehicle may include a receiver for receiving signals from secondary road user's indicative of their intended driving path and speed, and/or present position. The host vehicle 100 may in this way detect the position and speed of the secondary road user 108 via direct communication between the host vehicle 100 and the secondary road user 108, or for instance communication via the cloud.

The position and speed of the secondary vehicle 108 is used together with the plurality of modelled clusters of trajectories 110 for the roundabout 102 for predicting at least one feasible trajectory 114, 109a, 109b, 109c which the secondary vehicle 108 may pursue in the round about 104. Accordingly, first a large set of possible model clusters of trajectories 110 is received, and based on the position and speed of the secondary vehicle, at least one possible trajectory 114, 109a, 109b, 109c is/are predicted for the secondary vehicle 108.

One feasible trajectory among the predicted at least one feasible trajectories 114, 109a, 109b, 109c is determined based on a selection criterion, for example, the most probable trajectory may be one that does not cross-over to the same side of the road as the host vehicle 100. Thus, the feasible trajectory 109a that crosses over to the road 104 is here considered to violate the selection criterion. Furthermore, it would be unsafe for the secondary vehicle 108 to travel along trajectory 109b since it would lead to a collision with the center part 113 of the roundabout 102. Moreover, in the present traffic situation based on right hand traffic, it would be unsafe for the secondary vehicle 108 to travel along the path 109c since it leads to wrong way travelling through the roundabout 102.

Other possible selection criterion may be related to decreasing fuel consumption, drive convenience, provide a comfortable ride, to mention a few exemplary selection criteria that may also relate to the host vehicle drive preferences. For example, the host vehicle may prioritize to reduce fuel consumption, whereby this is sued as a selection criterion when selecting a feasible trajectory. The host vehicle 100 may proceed though the roundabout 102 as planned if the selected feasible trajectory 114 for the secondary vehicle is a safe trajectory for the perspective of the host vehicle 100.

In some embodiments the model trajectories 110 also include model speed profiles for the model trajectories. Thus, a speed profile for the secondary road user 108 may also be predicted based on the position and the speed of the secondary road user 108 and the modelled clusters of trajectories 110.

Furthermore, in some embodiments the model trajectories 110 also include yaw rate data and acceleration data for each of the plurality of trajectories 110. Thus, the host vehicle 100 may retrieve a plurality of model clusters of trajectories 110 including trajectories data, speed profiles, and yaw rate data and acceleration data for positions along the model clusters of trajectories 110.

In case it is determined that the host vehicle 100 is on collision course with the secondary road user 108, an intervention action may be triggered in the host vehicle 100. The intervention action may for example include changing the present course of the host vehicle 100 or reducing or increasing the speed of the host vehicle 100. In addition, in some embodiments a warning signal may be provided in the host vehicle 100 to notify at least the driver of the host vehicle 100 about the collision course.

FIG. 2 illustrates a simplified scenario of predicting at least one feasible trajectory for the secondary road user 108. FIG. 2 illustrates four clusters of model trajectories, a first cluster 210, a second cluster 220, a third cluster 230, and a fourth cluster 240. In accordance with embodiments, the position of the secondary road 108 user is detected by the host vehicle and is matched with a set of positions along each of the clusters 210, 220, 230, and 240. Using a distance metric it may be possible to determine that the vehicle is closest to the cluster 230. For the present scenario it may be assumed that the vehicle 108 has just started travelling along the model trajectory 230.

However, if the vehicle 108 was in the middle of the two clusters 230 and 210 it may not be possible to select which of the clusters the vehicle 108 is driving along. In that case both clusters 210 and 230 of trajectories are considered feasible trajectories.

Figures 3A, 3B, 3C:
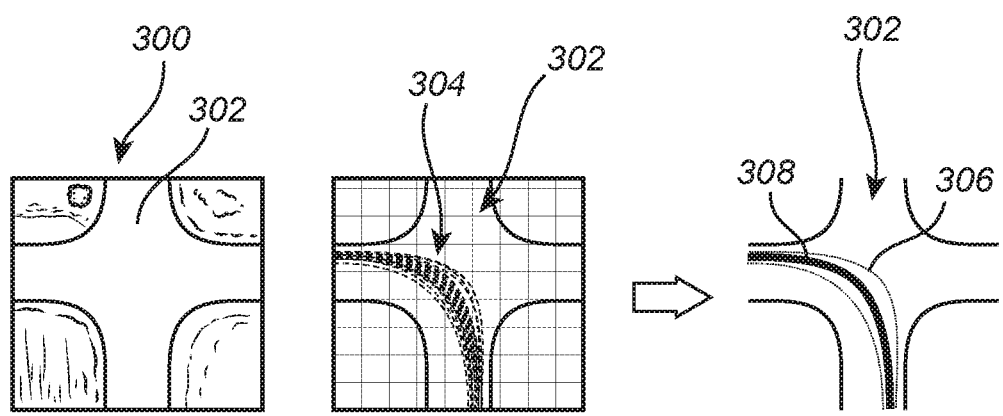
FIG. 3A-C conceptually illustrates exemplary data collection for a supervised learning algorithm for various embodiments of the disclosure.

FIG. 3A-C conceptually illustrates exemplary data collection for a supervised learning algorithm subsequently used for reproducing trajectories for a plurality of traffic situations. In FIG. 3A a conceptual satellite image 300 or HD map 300 of a traffic situation 302 is shown. Trajectory data for a traffic situation is received by a control unit, i.e. located on a server 112 as illustrated in FIG. 1. The trajectory data is received from a plurality of road user travelling through the same traffic situation. For example, the road users may transmit their GPS coordinates and other information such as vehicle speed, yaw rate, acceleration, detected traffic signs, detected position and speed of nearby objects, weather data, time of day, date, friction measurements, road condition data as they travel through the traffic situation 302. This results in a large set of trajectories 304 for the traffic situation 302 as conceptually illustrated in FIG. 3B. This data collection is performed for a large set of traffic situations. Further, the trajectories 304 may be clustered into classes of trajectories such as turning left, stopping at stop line, driving straight, etc.

In addition, as conceptually illustrated in FIG. 3C the clustered trajectories may be parameterized providing a density contour 306 of trajectories through the intersection with an average trajectory set 308 being represented.

The control unit on the server 112 uses a supervised learning algorithm taught on the training data provided by the trajectories 304 and/or the parameterized clustered trajectories 306 in order to be able to reproduce trajectories using satellite images of traffic situations as input. Accordingly, and with reference to FIG. 4, a deep neural network may be trained on the training data, and may subsequently, in an offline processing step, be provided with a satellite image 402 of a traffic situation 404, and based on the supervised learning algorithm the deep neural network is configured to create model clusters of trajectories 406 including speed profiles for the traffic situation 404 in the satellite image 402. The deep neural network may create model clusters of trajectories for any traffic situation for which there are satellite images or HD map data available. Accordingly, the present disclosure may advantageously provide predictions of secondary road user trajectories for a vast number of traffic situations.

In addition, the plurality of modelled clusters of trajectories depends on time of day, date, or weather and or other measurable environmental conditions that may be used as input to the deep learning network. Accordingly, the finally predicted trajectory and speed profile for the secondary vehicle is also based on the present weather, time of day, the season of the year, etc.

In one possible implementation the training data includes traffic object data indicative of a detected position and speed of objects nearby the traffic situation or in the traffic situation. It then becomes possible for a deep neural network to classify the modelled clusters of trajectories depending on the traffic object data. Thus, firstly the deep neural network constructs the modelled clusters of trajectories, subsequently, a separate deep neural network taught on historical traffic object data uses present traffic object data to filter out only a sub-class of model clusters of trajectories. Accordingly, the host vehicle may transmit present traffic object data to the server or central control unit which then only returns sub-classes of model trajectories that are relevant based on the present traffic object data for the present traffic situation.

Alternatively and as is illustrated in FIG. 5, the host vehicle 100 receives the model clusters of trajectories 110 as described with reference to e.g. FIG. 1, and the filtering step for providing only a sub-class 111 of model clusters of trajectories is performed in the host vehicle 100. More specifically, as the host vehicle 100 approaches the traffic situation 102 and has provided its location to the central control unit on the server 112, the central control unit returns the model clusters of trajectories 110. The host vehicle 100 then provides its traffic object data and the model clusters of trajectories 110 to an algorithm such as provided by a deep neural network operative on a vehicle control unit in order to filter out the sub-class 111 of model clusters of trajectories.

The traffic object data may for example include information that there is a traffic jam 408 in the path 405. It can be concluded by the deep neural network that the secondary vehicle 108 is not able to drive on model clusters of trajectories on the road path 405 since it is jammed with vehicles. The deep neural network operative on the vehicle may the filter out a sub-class 111 of model trajectories which excludes trajectories that interfere with the detected traffic jam 408. The prediction of at least one feasible trajectory 114 may subsequently be performed based on the sub-class 111 of trajectories. By performing the filtering in the host vehicle 102 less data has to be transferred to the server, i.e. the traffic object data used for filtering out the sub-class of trajectories does not have to be transferred to the server since that traffic object data may be processed in the host vehicle.

In other possible implementations, only a single deep neural network is used. In this case, the deep neural network is trained on training data including satellite images 300 and/or HD maps 300, and traffic object data. The deep neural network may in this case receive a satellite image and/or an HD map of the present traffic situation, and present traffic object data from a host vehicle, whereby the deep neural network only returns sub-classes of model trajectories that are relevant based on the present traffic object data for the present traffic situation.

Figure 6:
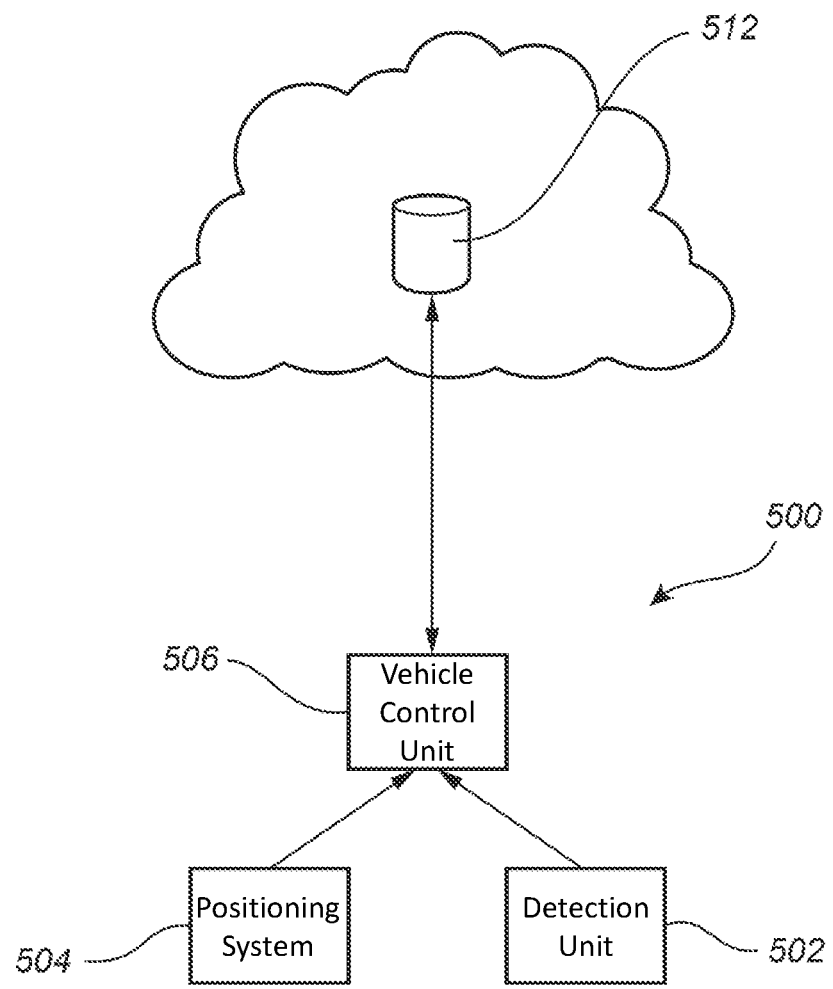
FIG. 6 schematically illustrates a system according to embodiments of the disclosure.

FIG. 6 illustrates a box diagram of an example active safety system 500 for a host vehicle. The system 500 includes at least one detection unit 502 for detecting the position and speed of a secondary road user. The detection unit(s) 502 may for example be on-board sensors such as at least one of a LIDAR device, a Radar device, an image capturing device, an ultrasound sensor, or any type of proximity sensor suitable for detecting secondary road user's present in the vicinity of the host vehicle. In addition, the system 500 may also include an inertial measurement unit (not shown) for measuring the host vehicle's yaw rate and acceleration. Moreover, the detection unit 502 may include a receiver for receiving signals from secondary road user's indicative of their intended driving path and speed, and/or present position. The communication between the host vehicle and secondary road user's may be achieved via communication systems selected from any one of V2x ("vehicle-to-everything") communication using wireless communication. V2x includes for instance vehicle-to-vehicle communication, vehicle-to-infrastructure communication, vehicle-to-pedestrian communication, vehicle-to-grid communication, and vehicle-to-device communication.

The active safety system 500 further includes a positioning system 504 for determining a present position of the host vehicle. The positioning system 504 may for example include a global positing system (GPS) and/or a high definition (HD) map based positioning system.

A vehicle control unit 506 is configured to retrieve a plurality of modelled clusters of trajectories for a present traffic situation from a server 512 or central control unit. The host vehicle 100 may therefore include wireless communication circuitry (not shown) for receiving the plurality of modelled clusters of trajectories from the server 512. The present traffic situation is selected based on a present location of the host vehicle determined based on position data from the positioning system 504. Thus, the vehicle control unit 506 processes the position data in order to determine the present location of the host vehicle. Information about the present location of the host vehicle is received by the server 512 so that the correct modelled clusters of trajectories may be provided to the host vehicle. For example, it may be concluded which roundabout or intersection is located at the present location of the host vehicle 100.

The vehicle control unit 506 is configured to predict at least one feasible trajectory for a detected secondary road user at the present traffic situation. The at least one feasible trajectory is predicted based on the position and the speed of the at least one secondary road user and the plurality of modelled clusters of trajectories for the present traffic situation. Next, the vehicle control unit 506 selects at least one of the feasible trajectories for each secondary road user based on a selection criterion. If necessary from a safety perspective, the control unit 506 subsequently controls the host vehicle to perform at least one action based on the most probable trajectories.

Figure 7:
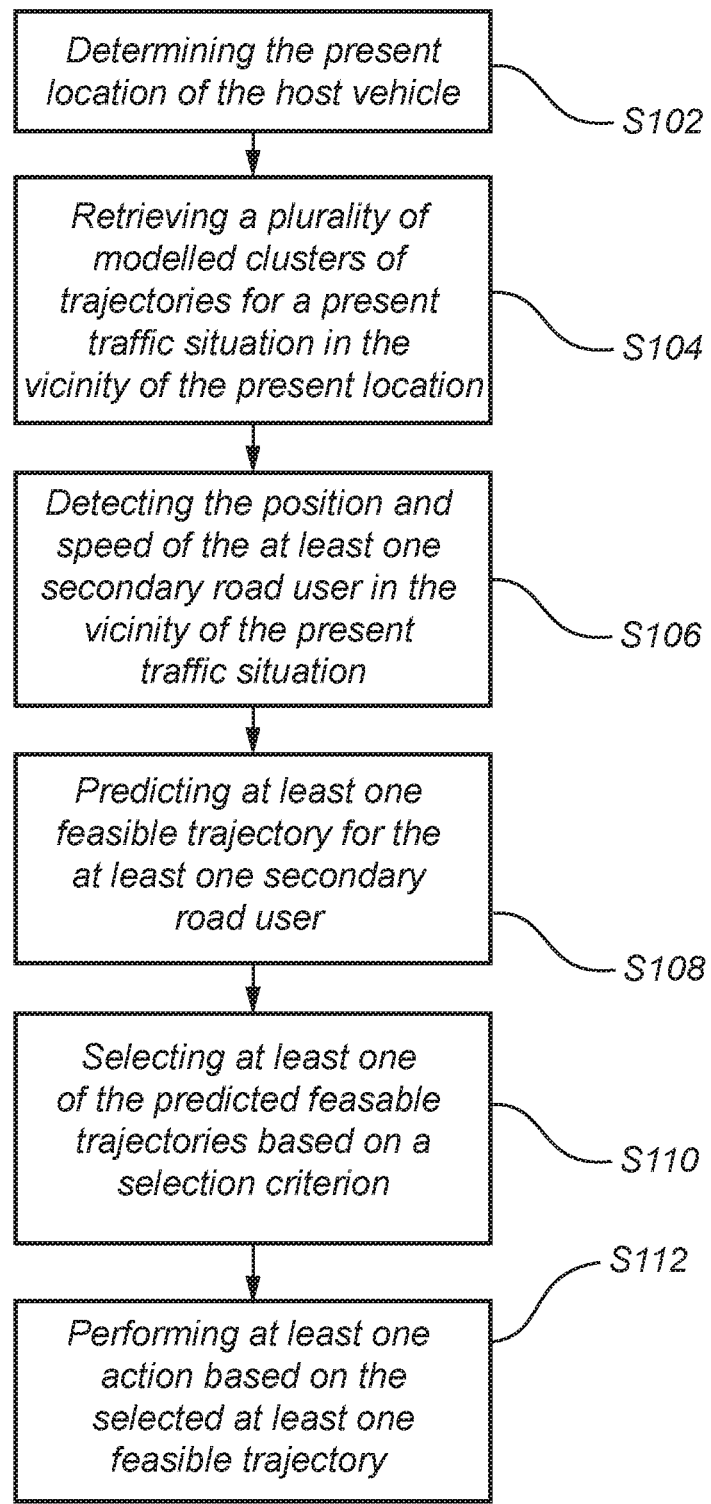
FIG. 7 is a flow chart of method steps according to embodiments of the disclosure.

FIG. 7 is a flow chart of method steps according to embodiments of the disclosure. In a first step S102 the present location for a host vehicle is determined. In step S104 a plurality of modelled clusters of trajectories is retrieved for a present traffic situation in the vicinity of the present location. A position and speed of the at least one secondary road user in the vicinity of the present traffic situation is determined in step S106. In a subsequent step S108, predicting at least one feasible trajectory for the at least one secondary road user based on the position and the speed of the at least one secondary road user and the plurality of modelled clusters of trajectories for the present traffic situation. At least one feasible trajectory of the feasible trajectories is selected S110 for each secondary road user based on a selection criterion. At least one action is performed S112 based on the selected at least one feasible trajectory.

Figure 8:
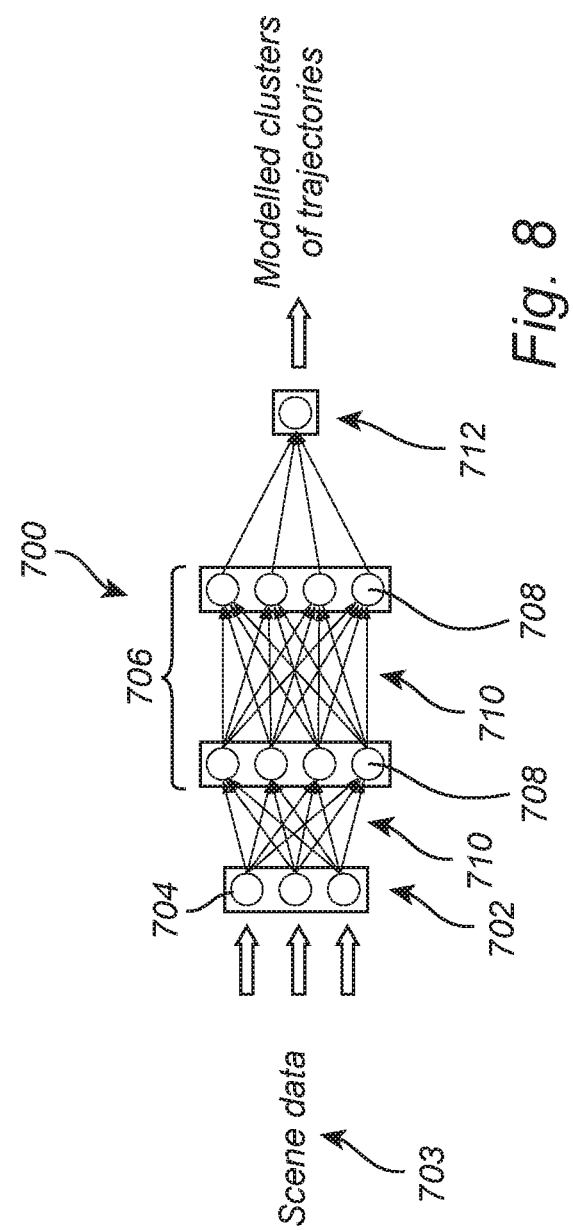
FIG. 8 illustrates a block diagram of an exemplary deep neural network.

FIG. 8 illustrates a possible approach of implementing a deep neural network for generating modelled clusters of trajectories. FIG. 8 specifically illustrates a block diagram of a feed forward deep neural network 700.

The block diagram includes an input layer 702, configured to receive input data to the deep neural network. The input data includes scene data 703 such as satellite images, HD map data, speed limits, etc., of a traffic situation. The input layer includes nodes 704 associated with each of the inputs.

The deep neural network 700 also includes one or more convolutional layers, and optional recurrent or recursive layers in block 706. A deep neural network based on recurrent layers take current data from the input layer 702 as an input in addition to previously processed data. In other words, recurrent layers are advantageously used for capturing the history of the input data.

Nodes 704 of the input layer 702 communicate with the nodes 708 of the layers 706 via connections 710. The connections 710 and weights of the connections are determined during training sessions such as supervised training.

A modelled cluster of trajectories is output in the output layer 712. The output modelled clusters of trajectories may be provided in the form of polynomial coefficients of a curve fitted to a predicted trajectory or just a down-sampled version of the predicted modelled trajectory.

It should be noted that the number of connections and nodes for each layer may vary, FIG. 8 is only provided as an example. Accordingly, in some deep neural network designs more than the indicated layers in FIG. 8 may be used.

Figure 9:
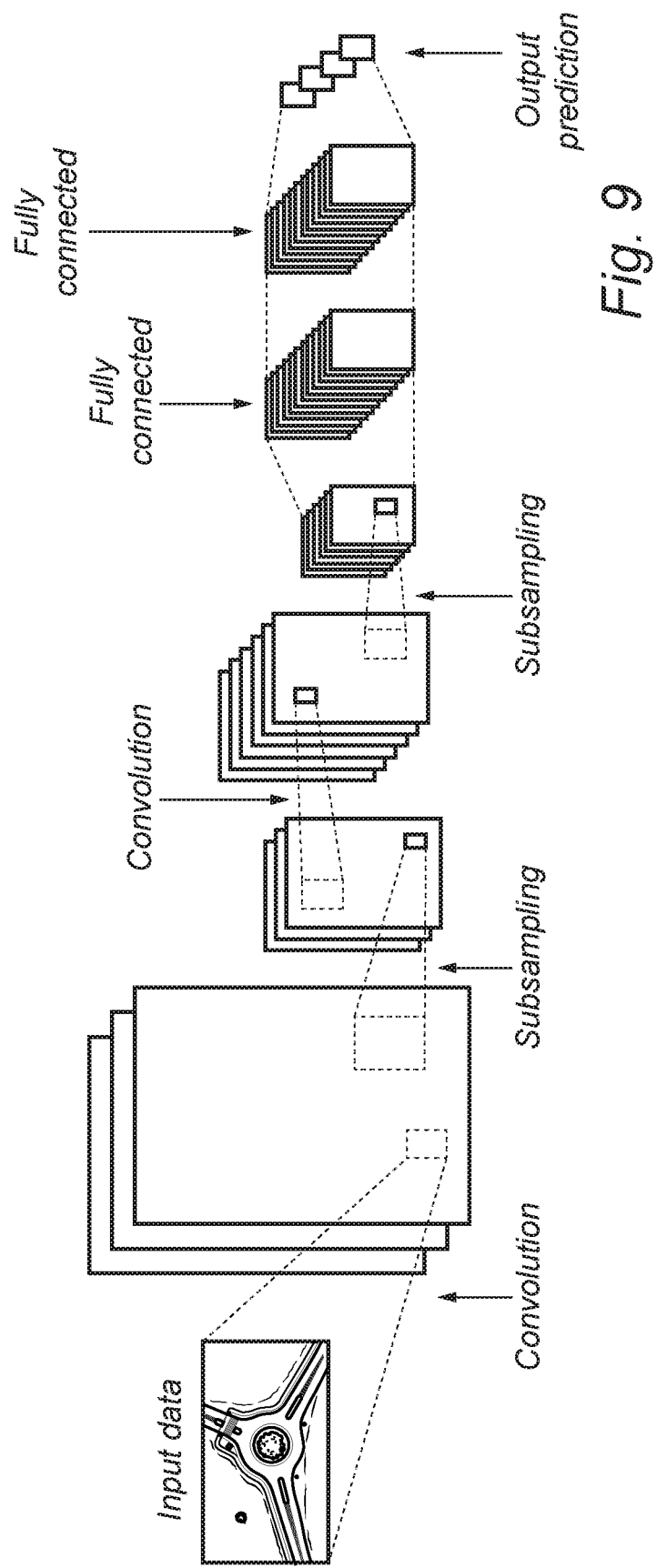
FIG. 9 conceptually illustrates a convolutional neural network.

FIG. 9 conceptually illustrates a convolutional neural network in line for possible use with the inventive concept, for example combined with the illustrated neural network in FIG. 8. In a convolutional neural network, as is known to the skilled person, convolutions of the input layer are used to compute the output. Local connections are formed such that each part of the input layer is connected to a node in the output. Each layer applies filters whereby the parameters of the filters are learned during training phases for the neural network.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present disclosure by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for predicting a trajectory of at least one secondary road user for avoiding a collision course with the secondary road user for a host vehicle, the method comprising:
   using a positioning system, determining a present location for the host vehicle;
   using a vehicle control unit, retrieving from a server a plurality of previously modelled and stored clusters of trajectories for a present traffic situation in a vicinity of the present location, created based on a supervised learning algorithm trained on training data comprising trajectory data for a plurality of traffic situations for which scene data is available;
   using the vehicle control unit and the supervised learning algorithm, filtering out a sub-class of model trajectories based on traffic object data indicative of the present traffic situation, wherein the traffic object data comprises at least information about traffic objects blocking potential paths for the secondary road user;
   using at least one detection unit, detecting a position and speed of the at least one secondary road user in the vicinity of the present traffic situation;
   using the vehicle control unit, determining at least one feasible trajectory for the at least one secondary road user based on the position and the speed of the at least one secondary road user and the plurality of previously modelled and stored clusters of trajectories for the present traffic situation excluding the filtered out sub-class of model trajectories based on the present traffic situation, wherein the position of the at least one secondary road user is compared to positions of the plurality of previously modelled and stored clusters of trajectories for the present traffic situation excluding the filtered out sub-class of model trajectories;
   using the vehicle control unit, selecting at least one of the determined at least one feasible trajectory for each secondary road user based on a selection criterion for the secondary road user indicating at least one feasible trajectory that is safe for the secondary road user and based on a selection criterion for the host vehicle related to host vehicle drive preferences, and
   using the vehicle control unit, performing at least one action based on the selected at least one feasible trajectory.

2. The method of claim 1, wherein the previously modelled and stored clusters of trajectories further comprises a speed profile for each of the trajectories, the method further comprising:
   predicting a speed profile for each of the plurality of trajectories of the previously modelled and stored clusters of trajectories for the at least one secondary road user based on comparing the position and the speed of the at least one secondary road user to the previously modelled and stored clusters of trajectories including modelled speed profiles for the present traffic situation;

selecting at least one feasible trajectory of the predicted plurality of trajectories of the previously modeled and stored clusters of trajectories including a speed profile for each secondary road user based on the selection criterion for the secondary road user, and performing at least one action based on the selected at least one feasible trajectory.

3. The method of claim 1, wherein the at least one action comprises providing a warning signal indicative of that the host vehicle is on collision course with at least one secondary road user.

4. The method of claim 1, wherein the at least one action comprises selecting a path for the host vehicle to avoid a collision course with the at least one secondary road user.

5. The method of claim 1, wherein the at least one action comprises triggering an intervention action when it is determined that the host vehicle is on collision course with at least one secondary road user.

6. The method of claim 1, further comprising:
generating modelled clusters of trajectories, including the plurality of previously modelled and stored clusters of trajectories, for the plurality of traffic situations for which scene data is available based on the supervised learning algorithm applied to received trajectory data for the plurality of traffic situations and a geometry of the traffic situations.

7. The method of claim 6, wherein the scene data is determined from at least one of photos or map data for the traffic situations.

8. The method of claim 6, wherein the scene data comprises speed limit data for the traffic situations.

9. The method of claim 6, wherein the generation of the modelled clusters of trajectories is performed in a deep neural network.

10. The method of claim 1, further comprising:
selecting the retrieved plurality of previously modelled and stored clusters of trajectories for the present traffic situation based on a match between the location of the host vehicle and one of the plurality of traffic situations.

11. The method of claim 1, wherein the plurality of previously modelled and stored clusters of trajectories depends on time of day, date, or weather and/or other measurable environmental conditions.

12. The method of claim 1, further comprising:
determining the sub-class of modelled clusters of trajectories based on traffic object data indicative of traffic characteristics of the present traffic situation, wherein the predicting of the at least one feasible trajectory for the at least one secondary road user is based on the position and the speed of the at least one secondary road user and on the sub-class of modelled clusters of trajectories.

13. An active safety system for a host vehicle, comprising:
at least one detection unit for detecting a position and a speed of a secondary road user;
a positioning system for determining a present location of the host vehicle, and
a vehicle control unit configured to:
retrieve from a server a plurality of previously modelled and stored clusters of trajectories for a present traffic situation, the present traffic situation is based on the present location of the host vehicle, the plurality of previously modelled and stored clusters of trajectories generated for a plurality of traffic situations for which scene data is available based on a supervised learning algorithm applied to received trajectory data for a plurality of traffic situations and a geometry of the traffic situations;
filter out a sub-class of model trajectories based on traffic object data indicative of the present traffic situation, wherein the traffic object data comprises at least information about traffic objects blocking potential paths for the secondary road user;
determine at least one feasible trajectory for the at least one secondary road user based on the position and the speed of the at least one secondary road user and the plurality of previously modelled and stored clusters of trajectories for the present traffic situation excluding the filtered out sub-class of model trajectories based on the present traffic situation, wherein the position of the at least one secondary road user is compared to positions of the plurality of previously modelled and stored clusters of trajectories for the present traffic situation excluding the filtered out sub-class of model trajectories;
select at least one of the determined at least one feasible trajectory for each secondary road user based on a selection criterion for the secondary road user indicating at least one feasible trajectory that is safe for the secondary road user and based on a selection criterion for the host vehicle related to host vehicle drive preferences, and
control the host vehicle to perform at least one action based on the selected at least one feasible trajectory.

14. The active safety system of claim 13, wherein the at least one action comprises at least one of:
providing a warning signal indicative of that the host vehicle is on a collision course with at least one secondary road user,
triggering an intervention action when it is determined that the host vehicle is on the collision course with at least one secondary road user, and
selecting a path for the host vehicle to avoid the collision course with the at least one secondary road user.

15. A vehicle comprising the active safety system of claim 13.

* * * * *